United States Patent [19]
Chacon

[11] 3,852,727
[45] Dec. 3, 1974

[54] MULTIPLE VOLTAGE MONITORING APPARATUS

[75] Inventor: Manuel Frank Chacon, Mequon, Wis.

[73] Assignee: Johnson Service Company, Milwaukee, Wis.

[22] Filed: Dec. 15, 1972

[21] Appl. No.: 315,569

[52] U.S. Cl. .......... 340/213 R, 340/248 A, 340/333, 324/98
[51] Int. Cl. .......................................... G08b 23/00
[58] Field of Search ........ 340/213 R, 248 A, 248 B, 340/248 C, 324 R, 325, 333, 413; 324/98

[56] References Cited
UNITED STATES PATENTS

| | | | |
|---|---|---|---|
| 3,473,151 | 10/1969 | Moreines et al. | 340/213 R |
| 3,541,550 | 11/1970 | Hamre | 340/324 |
| 3,696,364 | 10/1972 | Lavelle | 340/213 R |
| 3,702,469 | 11/1972 | Golja | 340/333 |

*Primary Examiner*—John W. Caldwell
*Assistant Examiner*—Richard P. Lange
*Attorney, Agent, or Firm*—Andrus, Sceales, Starke & Sawall

[57] ABSTRACT

A multiple voltage monitor includes individual sensing networks for each source with respect to a common reference connected by a logic network for detecting a voltage failure and transmitting a digital fault signal to a loop controller. The positive and negative voltage sensing network includes respective pull-down and pull-up resistors with outputs individually connected into a trigger unit. An isolated voltage is detected by an opto isolator circuit connected to the trigger unit. A NOR gate combines the signals of the negative voltage sensing networks and a capacitor or the like is provided to the output side of the circuit to integrate any oscillations of the NOR gate output as its inputs cross an undefined voltage area. The trigger unit drives an externally self-powered buffer logic gate. When a plurality of multiple voltage systems are employed several monitoring circuit systems may be connected in an OR fashion with the output driving a self-powered receiver gate. The output of the latter is coupled to the frame handling logic to signal a power malfunction and to disable the command feature of a message frame.

13 Claims, 1 Drawing Figure

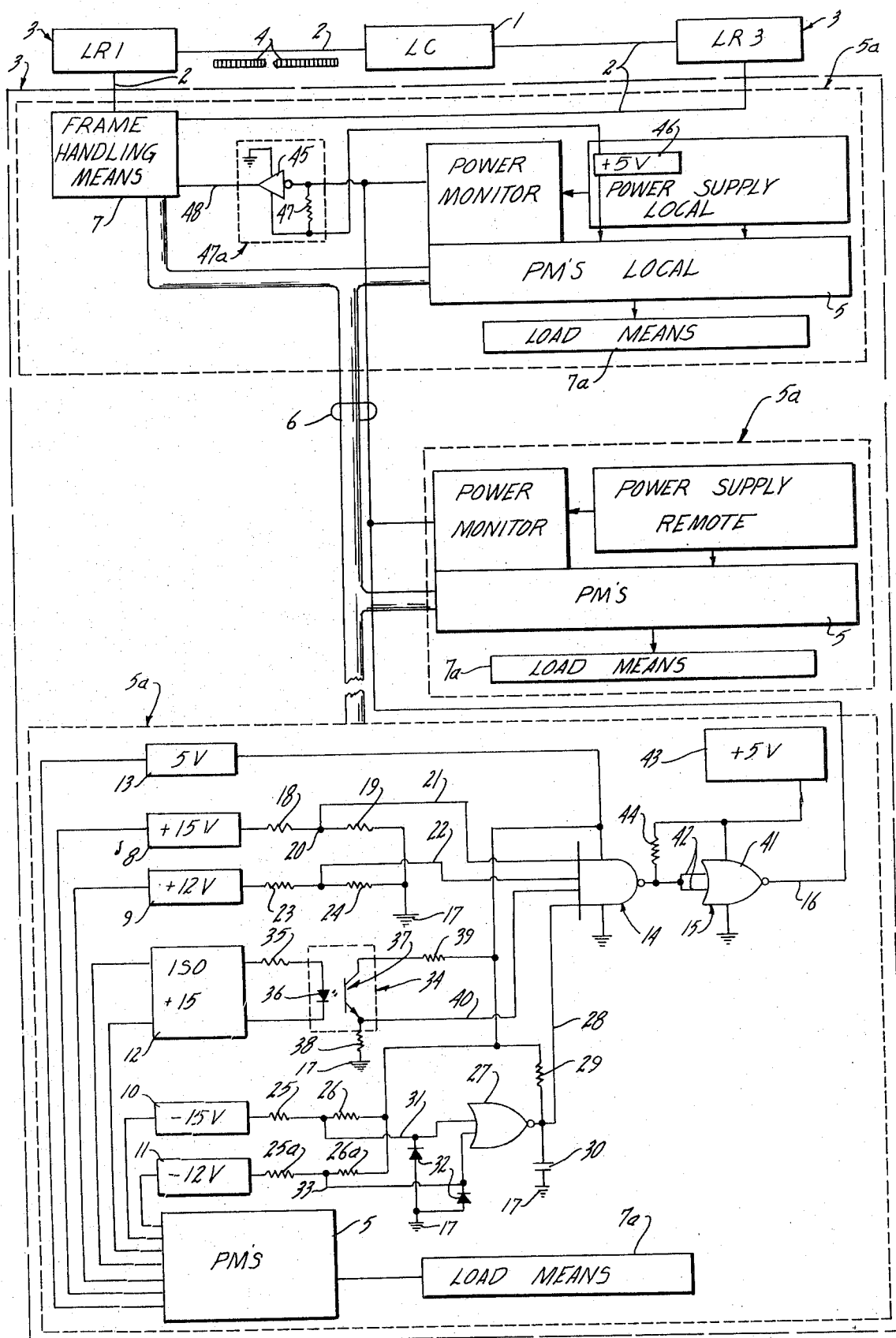

3,852,727

MULTIPLE VOLTAGE MONITORING APPARATUS

BACKGROUND OF THE INVENTION

The present invention relates to a multiple voltage monitoring apparatus and particularly to such apparatus which can monitor and detect failure of supply voltages in a remote control system.

The development of combined digital and analog control systems generally requires a multiplicity of power supply voltages in any given system. This is necessary because of requirements and limitations imposed by the individual components and circuits. For example, in the copending application of Buchanan, et al, entitled "DATA COMMUNICATION SYSTEM EMPLOYING A SERIES LOOP," Ser. No. 315,567 which was filed on Dec. 15, 1972 the same day as this application and is assigned to the same assignee, a data communication serial loop is shown wherein data communication is provided between a computerized control center and a plurality of remote stations. Each of the remote stations are provided with the necessary hardware for monitoring and controlling an operating system such as a heating, ventilating and air conditioning system in a building or complex of buildings, as well as the digital signal processing means for receiving and responding to multiple bit message frames. Such systems employ a variety of logic circuitry, switching circuitry and operating power supply circuitry. Thus, at any given remote station or multiple load point within such station a plurality of different voltage sources or supplies must be provided. Erroneous or erratic signals can be developed if the various sources do not maintain continuous and proper operation. Further, in a data communication loop system and the like, the monitoring system should desirably provide for generation of a recognizable digital signal associated with a voltage source malfunction or failure.

For generally widely produced control systems and the like, the cost of the monitoring system must be minimized while maintaining very reliable detection. Further, the various voltages may include both positive and negative supplies as well as isolated voltages all of which must be continuously monitored, with the malfunction signal generated in response to corresponding malfunction or failure of any voltage.

SUMMARY OF THE PRESENT INVENTION

The present invention is particulary directed to a relatively simple and reliable monitoring means which can be connected to continuously monitor the operating condition of the several source voltages required in a given remote location or the like and which may be interconnected with other similar multiple voltage sources to provide continuous monitoring at a single point.

Generally, in accordance with the present invention, a common reference is provided for monitoring all of the several voltages, with each of the voltage sources connected to such common reference by a sensing branch means. An output means of each branch is connected to a logic detector means. The output of logic detector means drives a separately externally powered gate to produce a failure signal in response to the malfunction or total failure of any one of the monitored voltages.

In accordance with the present invention, the positive and negative voltages are connected into the monitoring circuit through respective sensing resistance networks having outputs individually connected into a common triggering logic circuit. The isolated voltage is detected by an integrated circuit defining an opto isolator which produces a similar output signal. The several outputs are connected through the logic circuit such that failure in any one voltage generates digital logic output signal, which is applied to the trigger circuitry, such as the conventional Schmitt trigger unit. The output of the Schmitt trigger is, of course, a related square wave type signal or a dual stage signal which is interconnected to drive an externally powered open collector buffer circuit of an integrated circuit construction. Thus with all voltages in a normal state the inputs to the logic circuit are at a relatively high voltage. This results in an essentially high logic signal to the triggering circuitry. In accordance with a preferred construction a multiple input dual NAND Schmitt trigger unit includes an individual input for the load operating voltages. Thus, in practical systems for heating, ventilating, and air-conditioning a pair of positive voltage supplies are connected in circuit through pull-down resistors. The isolated supply is connected to the opto isolator which is connected as an input to the Schmitt unit. The two negative supplies are connected to pull-up resistors and combined through a NOR gate to the fourth input of the trigger circuit. An externally powered gate is driven from the Schmitt trigger unit to generate an output signal whenever the output of the Schmitt trigger provides a logic "0" input means. The NOR gate combining the negative signals is provided with clamping diodes to prevent gate damage. Further, a capacitor or the like is provided to the output side of the circuit to integrate any oscillations of the NOR gate output as its inputs cross the undefined voltage area. The logic elements of the monitoring system are driven from the local logic power supply. Consequently, if the logic supply fails, the external powered gate circuit produces the necessary logic output signal indicating the failure of the local supply.

Thus, the several main control and logic supply voltages are continuously and simultaneously monitored and create a failure signal even though the particular power failure may not individually be recognized.

Further, each of the remote modules or hardware elements, such as a separate chassis, may require similar individually supplied voltage systems any one of which may fail without failure in any other piece of equipment. It may be desired to maintain a single monitoring of all pieces of remote equipment at a single point. This is readily accomplished by providing the above individual systems and combining the several outputs in a suitable logic OR network driving a single gate with a buffered power supply. The output would provide the necessary digital logic signal for communication with the loop system.

The present invention provides a simple and inexpensive multiple voltage monitoring system for remote stations with automatic loop communication identifying the location of the fault.

DESCRIPTION OF DRAWING

The drawing furnished herewith illustrates a preferred construction of the present invention in which the above advantages and features are clearly disclosed as well as others which will be readily understood from the following description of the illustrated embodiment.

The drawing is a schematic circuit diagram of a preferred voltage monitoring system particularly adapted for use in digital communication loop systems.

DESCRIPTION OF ILLUSTRATED EMBODIMENT

Referring to the drawing the present invention is shown in connection with a data communication loop system employing a central loop controller 1 serially coupled by a loop communication cable 2 to a plurality of similarly constructed remote stations 3, generally as more fully disclosed in the previously referred to Buchanan, et al, application. Thus, the central controller 1 generates message frames 4, each of which includes a plurality of digital logic bits. The frames 4 are circulated in serial fashion throughout the loop to establish communication with the remote stations 3 in a selected manner. Each of the remote stations 3 generally includes a plurality of different point modules 5 coupled via a common bus cable 6 to a message frame handling means 7 which is connected to the cable 2 to receive and retransmit the message frames. The frame handling means 7 selectively transmits information of the message frames 4 to the several point modules 5 located within a related chassis 5a. Each of the point modules 5, in turn, include logic means for receiving the information from the message frame 4 and processing the information to provide for the selected operation of operating hardware or other load means 7a such as set point adjustment, checking the status of the hardward and/or receiving information from the hardware. For example, the system may be adapted to read an analog output of a temperature sensor. Alternatively, the point modules may control the start-stop motor control with sensing of the status of the motor operation. The message frames 4 are divided into a plurality of bit subgroups to provide for selective addressing of the remote station, the point module as well as the particular load means and function as more fully disclosed in the Buchanan, et al, application.

The present invention as illustrated in the drawing is applicable to each chassis 5a, and the one is shown in sufficient detail to permit full illustration and explanation of the present invention. To properly operate the logic process circuitry as well as the interconnecting coupling and switching circuits between the logic circuitry and the load operating power means requires a multiplicity of voltages. For example, in the loop communication system, the required voltages include a pair of positive supplies 8 and 9 of a potential of 15 volts and 12 volts as well as corresponding level negative voltage supplies 10 and 11. In addition a 15 volt isolated supply 12 is required for controlling of the hardware. Further, a 5 volt logic supply 13 is required for driving of the logic circuitry for processing of the message frame and the point modules 5. Additional voltage means, not shown, may be required for the frame handling means 7 for maintaining communication. As these are essentially for loop integrity, they are preferably connected as shown in the Buchanan, et al, application to by-pass the remote if such a voltage fails.

The three point modules 5, in the illustrated embodiment, are shown mounted on individual related chassis 5a, which have been correspondingly identified as chassis No. 1, No. 2, and No. 3. The chassis No. 1 is shown as a local unit and includes a local power supply system which may also provide the necessary power for operating of the frame handling means 7 as well as the other associated point logic and operating elements. The other two chassis 5a have separate remote power supply systems as shown.

In accordance with the present invention all of the remote module voltage supplies 8–13 are simultaneously and continuously monitored for each chassis 5a through a solid state monitoring system, a preferred construction of which is shown in the drawing. Generally, in accordance with the present invention each of the voltage supplies 8–13 is coupled to an individual detection circuit to produce an input to a triggering circuit 14 such as a multiple input dual NAND Schmitt trigger unit of an integrated circuit construction which will respond to a selected voltage at any one of its inputs. A suitable commercially available trigger unit is shown, for example, in the specification sheet of Texas Instrument for a SN7413 Schmitt trigger. The output of the trigger unit 14 is coupled to a self-powered gate unit 15 for generating a digital signal compatible with the loop communication system at a signal line 16.

More particularly, each of the power supplies 8, 9–10, 11, 12 and 13 are separately monitored through similar sensing branch metworks 16. Supply 8 is now described in detail. The positive 15 volt power supply 8 is connected to a common monitoring potential reference 17 by a pair of series-connected monitoring resistors 18 and 19. The resistors 18 is a relatively large resistor, while the resistor 19 is a relatively small resistor and constitutes a pull-down voltage sensing resistance. With the voltage at a normal level or within a selected range of normal levels, the point or junction 20 of the resistors 18 and 18 will be relatively high and above the trigger level of the Schmitt trigger 14; for example, two volts minimum. If the voltage output of supply 8 drops below a selected level, the monitoring point 20 will correspondingly drop below the triggering level of the Schmitt trigger 14; for example, 6/10 of a volt. The junction is connected via a signal lead 21 to the one input of a four input Schmitt trigger unit 14. This change in voltage, either due to a failure or a malfunction resulting in a significant decrease in supply voltage, thus produces a logic signal at the output of unit 14 which by convention may be identified by the logic "1" symbol (high voltage). The positive 12 volt power supply 9 is similarly connected to the common reference 17 to provide a corresponding signal at a monitoring lead 22. The network resistors 23 and 24 for supply 9 are selected to provide a corresponding input to unit 14. Thus, resistor 24 would generally be the same as pull-down resistor 19, while coupling resistor 23 is selected to maintain the desired input voltage.

The negative power supplies 10 and 11 are connected through similar networks including pull-up resistors 25, 25a, 26 and 26a to detect an absolute voltage decrease, with the monitored outputs combined in a NOR logic gate 27 and connected via a common signal line 28 to a single input of the Schmitt trigger unit 14. Thus, the negagive 15 volt supply is connected through the coupling resistor 25 and a pull-up resistor 26 from the supply 10. The pull-up resistor 26 is connected to the positive logic supply 13. The monitoring point or junction defined by the connection of resistors 25 and 26 is connected by an input line 31 to the one input of the NOR gate 27. If the 15 volt negative supply 10 should fail or malfunction to cause an effective failure, the voltage drop across the resistor 26 decreases. This will result in an increase in the voltage at the monitoring point and particularly input line 31 to a level above that required to actuate the NOR logic gate. In effect a logic "1" is applied to the input of the NOR gate 27 which, in accordance with the usual function, generates a logic "0" input at the connecting line 28 to the Schmitt trigger unit 14, which is transferred to line 16 as a logic "0" for communication to the loop controller and the like.

A clamping diode 32 is connected between the input to gate 27 and the common monitor reference 17 to clamp the voltage on the gate and prevent possible damage as the result of a relatively large negative voltage associated with a logic voltage supply 13 failure.

The negative 12 volt supply 11 is similarly connected through a pair of monitor resistors including a coupling resistor 25a and a pull-up resistor 26a which are connected in series between the supply 11 and the common connection to logic supply 13. An input line 33 similarly connects the monitored point to the second input of the illustrated NOR gate 27.

Thus, the failure of either negative voltage supply 10 or 11 provides a corresponding logic signal to the trigger circuit 14 to cause it to fire and generate a logic "1" output.

The capacitor 30 integrates any oscillations at the output of the NOR gate 27 as either of the dual negative inputs cross the undefined threshold area.

The isolated voltage supply 12 is detected through an integrated opto isolator circuit unit 34. Generally, such unit 34 includes a coupling resistor 35 connecting an input photo-diode 36 across the isolated 15 volt supply 12. The coupling photo-diode 36 provides a signal by its illuminating the light sensitive portion on an output light sensitive transistor driver 37 connected in an emitter follower output circuit. Thus, in the illustrated embodiment of the invention, the transistor 37 is an NPN transistor having the emitter connected to reference 17 through an emitter resistor 38. The collector of the transistor 37 is connected through a suitable coupling resistor 39 to the logic voltage power supply 13. The top side of resistor 38 is connected by an input line 40 to the fourth input of unit 14. A failure or sufficient malfunction of the isolated voltage supply 12 to simulate a failure results in the dropping of the output current of the opto isolator 34, with a corresponding decrease in the voltage developed across the sensing resistor 38.

This generates a logic "0" signal applied by line 40 to the Schmitt trigger unit 14 which, in turn, generates a logic "0" output signal at line 16 via actuating of the externally powered NOR gate 15.

The logic power supply 13 drives the Schmitt trigger circuit 14 as well as the unit 34. Failure of such supply will, of course, cause a corresponding failure of the trigger unit 14. This, in turn, generates a logic "1" state at the input of the externally powered NOR logic gate means 15 with a corresponding logic "0" output, again signalling a monitored power supply failure.

This, the externally powered logic means 15 is shown having its pair of inputs connected in common to the output of the Schmitt trigger unit 14. It is also connected to its own special external power supply 43 separate from the monitored voltages. In a practical construction, the external power supply 43 could be the logic voltage supply unit 46 which provides power to the frame handling means unit 7 in the first chassis unit 5a. Should that power supply fail, a relay could be provided and de-energized, causing the complete corresponding loop remote 3 to be disconnected from the series circuit and bypassed. As illustrated, a pull-up input resistor 44 connects the common inputs to the supply 43. The failure of any one of the monitored voltages causes the Schmitt trigger unit 14 aided by pull-up resistor 44 to establish a logic "1" which in turn drives the buffer gate 41 into saturation with the logic "1" changing to a logic "0" at line 16. Similarly, if there is a failure of the Schmitt trigger unit 14 as a result of the failure of the local supply 13, the externally powered pull-up resistor maintains a logical "1" input to the buffer unit 15 which results in the logic "0" failure output signal.

Each of the chassis 5a within a remote station 3 may be provided with a corresponding monitoring circuit with the several individual outputs interconnected in "wired or" configuration to the input of a gate 45 which is preferably coupled to its own voltage source 46, through a pull-up resistor 47 to define a power fail receivor 47a. If any one of the multiple power supplies at the several remotes includes a malfunction, the corresponding output chain generates a logic "0" at the common bus output line 16. A logic "0" at the input of the single receiver gate 45 results in a corresponding switching to a logic "1" output at a line 48 which is connected to the frame handling means unit 7 which transmits the information through cable 2 to the loop controller 1.

In this manner, the power supplies for the several chassis units 5a, each containing several point modules, will be continuously monitored at a single central point with appropriate action or information being transferred into the digital loop.

In the event of an external power failure the system can, for example, provide for automatic by-pass of the related remote station such as disclosed in Buchanan et al application. Thus, such a failure is directed to a failure which is not unique to any one chassis 5a within a station 3 but is positively required to maintain communication.

The present invention thus has been found to provide a relatively low-cost design for continuous monitoring of a multiple output power supply system which can monitor positive, negative and isolated voltages.

Various modes of carrying out the invention are contemplated as being within the scope of the following claims, particularly pointing out and distinctly claiming the subject matter which is regarded as the invention.

I claim:

1. A multiple voltage monitoring apparatus for remote station connection in a loop communication system comprising a multiple input trigger means having a plurality of inputs, any one of said inputs being independently operable to trigger an output, a plurality of voltage power supply connection means, separate voltage monitoring means connected to each voltage supply connection means and providing a continuous monitoring of the corresponding voltage supply, means connecting each monitoring means to a separate input of the trigger means and each monitoring means being independently operable to actuate the trigger means in response to a selected deviation of the supply from a predetermined voltage, and an externally-powered buffer gate means having a separate power supply which is independent of other monitored power supplies and having an input connected to the output of the trigger means and establishing a voltage fault signal in response to any one of said deviations which actuates the trigger means and in response to a failure of its own power supply.

2. The monitoring apparatus of claim 1 including means to transmit the output signal to a loop communication system.

3. The monitoring apparatus of claim 1 wherein failure of said trigger means actuates the gate means to establish a voltage fault signal.

4. The multiple voltage monitoring apparatus of claim 1 wherein said plurality of voltage power supply connection means includes positive voltage means, said monitoring means including a pull-down resistor means connected to each positive voltage means with the voltage drop across the resistor means providing a continuous monitoring of the positive voltage supply, and means connecting the pull-down resistor means to a first input of the trigger means.

5. The multiple voltage monitoring apparatus of claim 1 wherein said plurality of voltage power supply connection means includes negative voltage means, said monitoring means including a pull-up resistor connected to the positive reference voltage means with the voltage across the pull-up resistor coupled to an input of the triggering means.

6. The multiple voltage monitoring apparatus of claim 1 wherein said plurality of voltage power supply connection means includes an isolated voltage supply and a logic power supply, said monitoring means including isolating voltage monitoring means with an input means connected to an isolated voltage supply connection means and having an output means connected as a second input to the trigger means, said isolating monitoring means being coupled to the logic power supply and driven thereby to produce an output signal in response to a failure of the isolated voltage supply.

7. The multiple voltage monitoring apparatus of claim 1 wherein said plurality of voltage power supply connection means includes a logic voltage means connected to energize said trigger means, failure of said trigger means resulting in a corresponding actuation of the externally-powered buffer gate means to generate a logic failure level signal at the corresponding output means.

8. The monitoring apparatus of claim 1 including a plurality of individual multiple voltage monitoring systems each constructed in accordance with claim 1 and further including a single receiver means having a single input connected to each of said buffer gate means, said single receiver means including its own voltage source connected in common to the outputs of the buffer gate means through a pull-up resistor to generate a logic signal at a common fault output line in response to the failure of a voltage in any one of the multiple voltage monitoring systems.

9. The multiple voltage monitoring apparatus of claim 1 wherein said multiple input trigger means includes a multiple input Schmitt trigger unit, said plurality of connection means including a logic voltage means to said trigger unit and similar positive and negative voltage means and an isolated voltage means, positive voltage monitoring means including pull-down resistor means with the voltage drop across the resistor means providing a continuous monitoring of one positive voltage means, means connecting the pull-down resistor means to a first input of the Schmitt trigger unit, an integrated isolating voltage monitoring means including an input means adapted to be connected to an isolated voltage means and having an output means connected as a second input to the trigger unit, said isolating circuit means being coupled to the logic voltage means and driven thereby to produce an output signal in response to a failure of the isolated voltage means, negative voltage monitoring means including a pull-up resistor with the output of the pull-up resistor coupled to a third input of the Schmitt trigger unit, failure of any one of the inputs to the said trigger unit resulting in a corresponding actuation of the externally-powered buffer gate means to generate a logic failure level signal at the corresponding output means.

10. The monitoring apparatus of claim 9 wherein said plurality of negative voltage monitoring means include a pair of said pull-up resistor means, gate means having a pair of inputs connected one each to each of said resistor means, said gate means having an output means connected to an input of the trigger unit, a pull-up resistor connected between said output means and said logic voltage means, and a capacitor connected at the output means.

11. The monitoring apparatus of claim 9 including a plurality of individual monitoring systems each constructed in accordance with claim and including a single receiver gate means having a single input connected in common to each of said output means, said single receiver gate being equipped with its own voltage source connected to all of the output signals through a pull-up resistor to aid in generating a logic signal at the common line in response to the failure of a voltage in any one of the multiple voltage sources.

12. A multiple voltage monitoring apparatus comprising a multiple input trigger means having a plurality of inputs, any one of said inputs being independently operable to trigger an output, a plurality of voltage power supply connection means including a positive voltage supply, a negative voltage supply, an isolated voltage supply and a logic power supply, a positive voltage monitoring means including pull-down resistor means connected to the positive voltage supply with the voltage drop across the resistor means providing a continuous monitoring of the positive voltage supply, means connecting the pull-down resistor means to a first input of the trigger means to actuate the trigger means to establish a trigger signal in response to a selected deviation of the positive voltage supply from a predetermined level, an integrated voltage isolating monitoring means including an input means adapted to be connected to said isolated voltage supply and having an output means connected as a second input to the trigger means, said isolating monitoring means being coupled to the isolated power supply and driven thereby to produce an output signal which actuates the trigger means in response to a selected deviation of the isolated voltage supply from a predetermined level, a negative voltage monitoring means connected to said negative voltage supply including a pull-up resistor with the output of the pull-up resistor coupled to an input of the trigger means to actuate the trigger means to establish a trigger signal in response to a selected deviation of the negative voltage supply from a predetermined level, an externally-powered buffer gate means having a separate power, supply which is independent of other monitored supplies and having an input connected to the output of the trigger means and establishes a voltage fault signal at one of a first or second logic levels in accordance with the receipt of a trigger signal from the trigger means and thereby responsive to said deviation of any one of the voltage supplies, failure of said trigger means establishing a trigger signal resulting in a corresponding actuation of the externally-powered buffer gate means to also generate a voltage fault level signal.

13. The multiple voltage monitoring apparatus of claim 12 having a NOR logic gate means having an individual input means connected to each of the pull-up resistors and a single output means connected to the trigger means, a pull-up resistor connecting the output of the gate means to the logic supply.

* * * * *